(12) United States Patent
Schaade

(10) Patent No.: US 7,583,615 B2
(45) Date of Patent: Sep. 1, 2009

(54) OPERATING MODE FOR A COMMUNICATION SYSTEM

(75) Inventor: Stephan Schaade, Buchloe (DE)

(73) Assignee: Siemens Aktiengesellschaft, Munich (DE)

( * ) Notice: Subject to any disclaimer, the term of this patent is extended or adjusted under 35 U.S.C. 154(b) by 809 days.

(21) Appl. No.: 10/720,679

(22) Filed: Nov. 25, 2003

(65) Prior Publication Data

US 2004/0132450 A1 Jul. 8, 2004

(30) Foreign Application Priority Data

Nov. 25, 2002 (DE) .............................. 102 54 904

(51) Int. Cl.
  *H04L 12/28* (2006.01)
  *H04Q 7/20* (2006.01)
  *G06F 15/177* (2006.01)
(52) U.S. Cl. .................... 370/254; 370/395.2; 370/400; 455/432.3; 709/220
(58) Field of Classification Search ................ 370/389, 370/392, 351, 395.2, 395.3, 395.32, 216, 370/219, 220, 221, 224, 227, 400, 401, 405, 370/408, 409; 714/1–7, 100
See application file for complete search history.

(56) References Cited

U.S. PATENT DOCUMENTS

| 6,119,001 | A  | * | 9/2000 | Delis et al. .................. 455/433 |
| 7,075,932 | B2 | * | 7/2006 | Matsuhira et al. ...... 370/395.31 |
| 2002/0022453 | A1 | * | 2/2002 | Balog et al. .................... 455/41 |
| 2002/0067693 | A1 | * | 6/2002 | Kodialam et al. ........... 370/216 |
| 2002/0080798 | A1 | * | 6/2002 | Hariguchi et al. ...... 370/395.31 |
| 2002/0097730 | A1 | * | 7/2002 | Langille et al. ............. 370/401 |
| 2002/0122394 | A1 | * | 9/2002 | Whitmore et al. ........... 370/328 |

* cited by examiner

*Primary Examiner*—Tri H Phan
(74) *Attorney, Agent, or Firm*—Staas & Halsey LLP

(57) ABSTRACT

A communication system has several communication devices, several communication terminals and a communication network connecting the communication terminals to the communication devices. A first address for a connection to a home communication device assigned to a specific communication terminal and a second address for a connection to an alternate communication device is stored in the communication terminals in each case. At least one terminal profile included in the terminal-relevant data is stored to which the second address can assign different communication terminals accessing the alternate communication device.

20 Claims, 2 Drawing Sheets

OPERATING MODE FOR A COMMUNICATION SYSTEM

CROSS REFERENCE TO RELATED APPLICATIONS

This application is based on and hereby claims priority to German Application No. 10254904.4 filed on Nov. 25, 2002, the contents of which are hereby incorporated by reference.

BACKGROUND OF THE INVENTION

The invention relates to a communication system having a plurality of communication devices, a plurality of communication terminals and a communication network connecting the communication terminals to the communication devices, in which case a first address for a connection to a home communication device assigned to a specific communication terminal and a second address for a connection to an alternate communication device is stored in the communication terminals in each case.

On the basis of an increasing global alignment of enterprises, the application of telecommunication services for transmitting voice and data is continuously increasing. This results in the fact that the costs incurred by these telecommunication services are continuously rising and are becoming a considerable cost factor for enterprises that are looking for opportunities to reduce these costs. Local and global computer networks such as the 'intranet' or the 'Internet' offer the possibility of transmitting data cost-effectively and worldwide. In this case, realtime critical data, for example, voice and video data is also increasingly being transmitted via such local and global package-oriented networks.

On the 'intranet' or the 'Internet', one or more centralized devices referred to in the literature as servers, communicate in each case with one another or with remote decentralized devices—referred to as clients in the literature. Examples of decentralized devices are stationary or portable computers, Internet Protocol-enabled telephones, etc. Communication takes place by using so-called Internet protocols, especially the Transmission Control Protocol/Internet Protocol. In this case, software that can understand and evaluate the Transmission Control Protocol/Internet Protocol—often referred to as 'socket' or 'TCP/IP stack' in the literature—is implemented in each case in the respective centralized and decentralized devices.

In order to transmit voice data starting from or for an Internet Protocol-enabled terminal, special centralized devices are usually provided in a computer network that are referred to as gatekeeper in the literature. In this case, one gatekeeper is usually permanently assigned to each Internet Protocol-enabled terminal that is designated as a home gatekeeper below. Therefore, a gatekeeper has the function of a centralized control element that controls a connection setup to or from the Internet Protocol-enabled terminal via the computer network. In this case, terminal-specific data—referred to as a terminal profile below—is stored in the gatekeeper by means of the control of the connection setup or the setup connection. The terminal-specific data then includes, amongst others, a call number assigned to the terminal, a subscriber assigned to the terminal or authorizations assigned to one of the terminals, keyboard layouts stored for the terminals, etc.

In addition to storing the terminal profile in the home gatekeeper, a further terminal profile is stored for each terminal in an alternate gatekeeper so that for cases in which the home gatekeeper or a part of the computer network assigned to the home gatekeeper fails or is interrupted, the connection setup or the connection can be routed through the alternate gatekeeper.

FIG. 1 shows the structure of a communication system KS developed according to the related art with several gatekeepers G-A, G-B, G-C, several communication terminals KE1, KE2, KE3 and a communication network IP-N connected to the communication terminals KE1, KE2, KE3 with the gatekeepers G-A, G-B, G-C. In this embodiment the data transmission via the communication network IP-N is based on the Internet Protocol in which case the communication terminals are KE1, KE2, KE2 Internet Protocol-enabled terminals. Alternately, the communication network IP-N can also be developed as a mobile radio network and the communication terminals KE1, KE2, KE3 as mobile radio terminals.

A first gatekeeper G-A is connected to the communication network IP-N via a network segment N-A, a second gatekeeper G-B via a network segment N-B and a third gatekeeper G-C via a network segment N-C. The first gatekeeper G-A is assigned as home gatekeeper to a first communication terminal KE1 with the call number 4711. Therefore, a terminal profile P4711 assigned to the first communication terminal KE1 is stored in the first gatekeeper G-A. The second gatekeeper G-B is assigned as home gatekeeper to a second communication terminal KE2 with the call number 6300. Therefore, a terminal profile P6300 assigned to a second communication terminal KE2 is stored in the second gatekeeper G-B. The third gatekeeper G-C is assigned as home gatekeeper to a third communication terminal KE3 with the call number 6529. Therefore, a terminal profile P6529 assigned to a third communication terminal KE3 is stored in the third gatekeeper G-C.

The address of the first gatekeeper G-A is stored in the first communication terminal KE1 for a connection to the first gatekeeper G-A. In the case of malfunctioning or failure of the first gatekeeper G-A or the network segment N-A, the address of an alternate gatekeeper—in this embodiment of the second gatekeeper G-B—is also stored in the first communication terminal KE1. In order to control the connection setup or a connection to the first communication terminal KE1, a terminal profile P4711 assigned to the first communication terminal KE1 is stored in the second gatekeeper G-B in addition to the terminal profile P6300 of the second communication terminal KE2.

The address of the second gatekeeper G-B is stored in the second communication terminal KE2 for a connection to the second gatekeeper G-B. In the case of malfunctioning or failure of the second gatekeeper G-B or the network segment N-B, the address of the first gatekeeper G-A is also stored as an alternate gatekeeper in the second communication terminal KE2. In order to control the connection setup or a connection to the second communication terminal KE2, a terminal profile P6300 assigned to the second communication terminal KE2 is stored in the first gatekeeper G-A in addition to the terminal profile P4711 of the first communication terminal KE1.

The address of the third gatekeeper G-C is stored in the third communication terminal KE3 for a connection to the third gatekeeper G-C. In the case of malfunctioning or failure of the third gatekeeper G-C or the network segment N-C, the address of the second gatekeeper G-B is also stored as an alternate gatekeeper in the third communication terminal KE3. In order to control the connection setup or a connection to the third communication terminal KE3, a terminal profile P6529 assigned to the third communication terminal KE3 is stored in the second gatekeeper G-B in addition to the terminal profiles P6300 and P4711 of the second and first communication terminal KE2, KE1.

In this way, the terminal profile with call number, authorizations, etc. is duplicated in the home gatekeeper and in the alternate gatekeeper according to the related art for each communication terminal or subscriber. This, considerably burdens the resources, e.g. databases of the gatekeeper of the communication system. In addition, high administrative costs are required for the duplication and, if required, updating the terminal profiles.

SUMMARY OF THE INVENTION

Therefore, one potential object of the invention is based on providing measures by which resources in the communication system can be economized.

In this case, at least one standardized terminal profile included in the terminal data is stored in each case in the communication devices to which different communication terminals can be assigned. Communication devices mean a device with a gatekeeper functionality connected to an Internet Protocol-based communication network. Therefore, a standard profile is used for all the terminals or subscribers that address the alternate communication device based on the lacking accessibility of their home communication device. Therefore, it is no longer necessary to provide a subscriber-specific terminal profile in an alternate communication device for each terminal or subscriber, but it is sufficient to provide a so-called "asylum profile" per alternate communication device.

An important advantage of the method is that, particularly in large systems, the costs for the device and administration of terminal profiles are considerably reduced. For example, in the case of a system with 10 communication devices and 10,000 communication terminals, 20,000 terminal profiles and, with that, also call numbers must be provided according to the related art. According to the method it is achieved that, for example, in the case of an erlang value of 0.1, a supply of 100 call numbers that can be assigned per communication device and the predefinition of only one asylum profile per communication device is sufficient. Therefore, according to the method the total number of call numbers required in the communication system only amounts to 11,000 in the case of 10,000 terminal profiles plus 10 asylum profiles.

An advantage of the developments is, amongst others, that the device of a call diversion from the home communication device to the alternate communication device gives, in a simple way, the accessibility of a subscriber or the communication terminal assigned to the subscriber, also in the cases in which the home communication device or one of the network segments assigned to the home communication device is faulty or has even failed.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
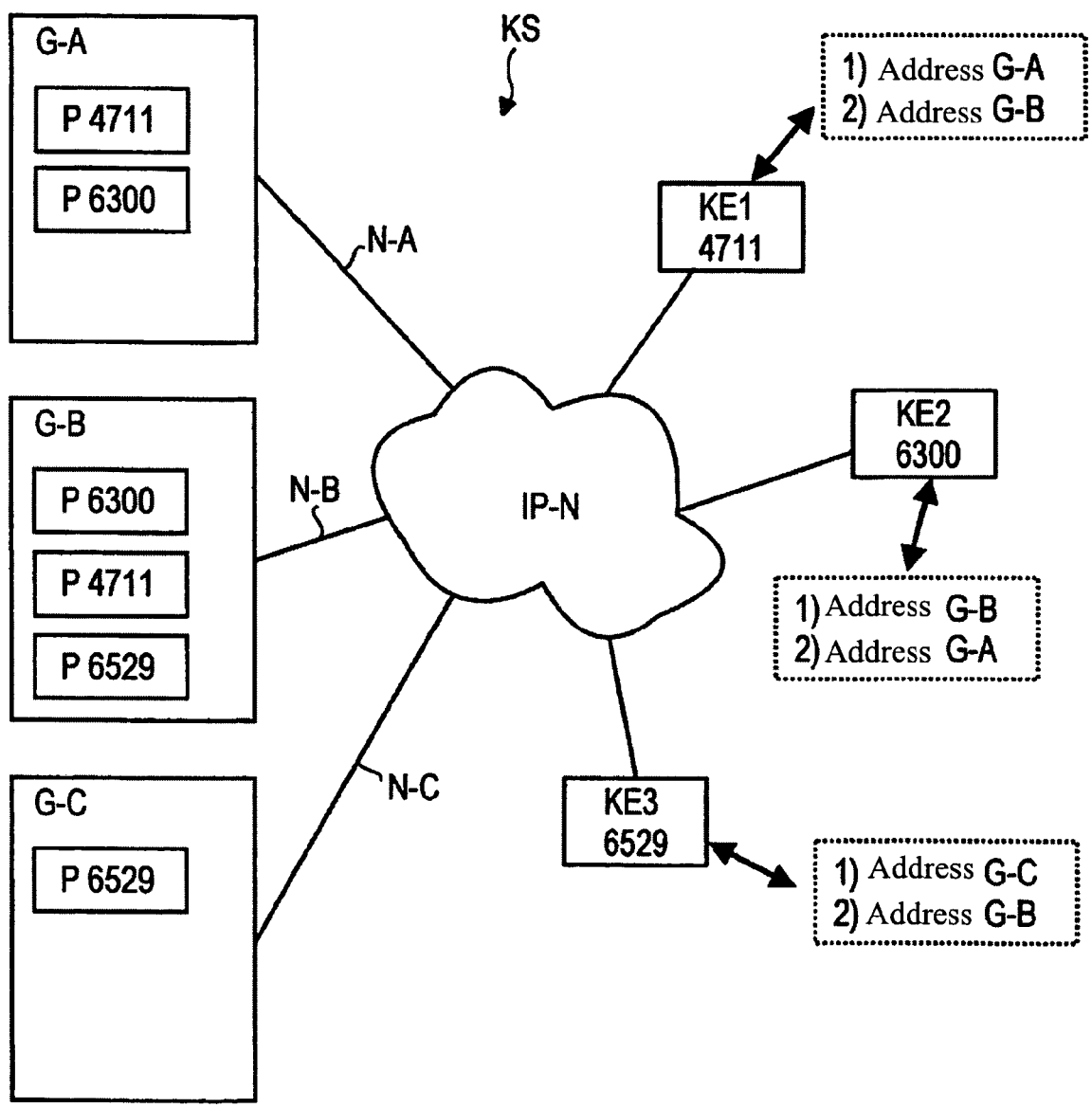
FIG. 1: a structure of a communication system with terminal profiles according to the related art.

Reference will now be made in detail to the preferred embodiments of the present invention, examples of which are illustrated in the accompanying drawings, wherein like reference numerals refer to like elements throughout.

Figure 2:
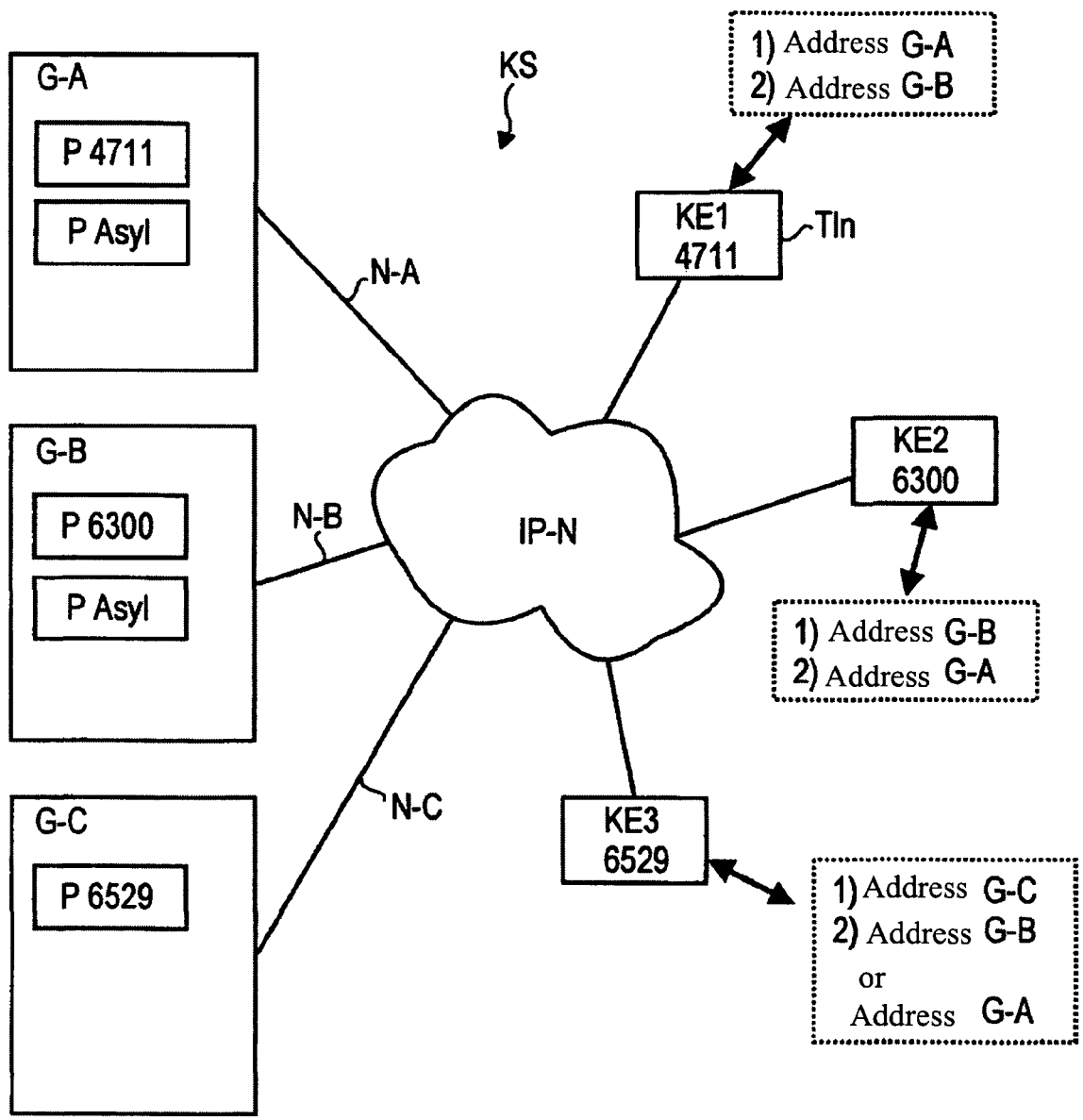
FIG. 2: a structure of the communication system with terminals and asylum profiles according to one aspect of the invention.

FIG. 2 shows a communication system KS according to one aspect of the invention with several gatekeepers G-A, G-B, G-C, several communication terminals KE1, KE2, KE3 and an Internet Protocol-based communication network IP-N connected to the communication terminals KE1, KE2, KE3 with the gatekeepers G-A, G-B, G-C. A first gatekeeper G-A is connected to the Internet Protocol-based communication network IP-N via a network segment N-A, a second gatekeeper G-B via a network segment N-B and a third gatekeeper G-C via a network segment N-C. In this embodiment, the gatekeepers G-A, G-B, G-C are implemented by communication systems, e.g. the communication systems Hicom or HiPath of Siemens AG.

A gatekeeper G-A, G-B, G-C is usually permanently assigned to each communication terminal KE1, KE2, KE3 through which a connection is routed from or to the communication terminal KE1, KE2, KE3. Such a gatekeeper G-A, G-B, G-C is designated as the home gatekeeper below. The first gatekeeper G-A is assigned as the home gatekeeper to a first communication terminal KE1 with the call number 4711. Therefore, in the first gatekeeper G-A, a terminal profile P4711 is assigned to the first communication terminal KE1. The second gatekeeper G-B is assigned as home gatekeeper to a second communication terminal KE2 with the call number 6300. Therefore, a terminal profile P6300 assigned to the second communication terminal KE2 is stored in the second gatekeeper G-B. The third gatekeeper G-C is assigned as home gatekeeper to a third communication terminal KE3 with the call number 6529. Therefore, a terminal profile P6529 assigned to a third communication terminal KE3 is stored in the third gatekeeper G-C. The communication terminals KE1, KE2, KE3 are Internet Protocol-enabled terminals, for example, Internet Protocol-telephones or portable or stationary computers with a corresponding telephone application running on the computer.

The address of the first gatekeeper G-A is stored for a connection with the first gatekeeper G-A—the home gatekeeper of the first communication terminal KE1 in the first communication terminal KE1. In the case of malfunctioning or failure of the first gatekeeper G-A or the network segment N-A, the address of an alternate gatekeeper—in this embodiment of the second gatekeeper G-B—is also stored in the first communication terminal KE1. The address of the second gatekeeper G-B is stored in the second communication terminal KE2 for a connection to the second gatekeeper G-B— the home gatekeeper of the second communication terminal KE2. In the case of malfunctioning or failure of the second gatekeeper G-B or the network segment N-B, the address of the first gatekeeper G-A is also stored as an alternate gatekeeper in the second communication terminal KE2. The address of the third gatekeeper G-C is stored in the third communication terminal KE3 for a connection to the third gatekeeper G-C—the home gatekeeper of the third communication terminal KE3. In the case of malfunctioning or failure of the third gatekeeper G-C or the network segment N-C, the address of the second gatekeeper G-B or alternately the first gatekeeper G-A is also stored as an alternate gatekeeper in the third communication terminal KE3.

Because the first and second gatekeepers G-A, G-B are provided as alternate gatekeepers in each case, an asylum profile PAsyl is stored in the first gatekeeper G-A in addition to the terminal profile P4711 for the first communication terminal KE1. In the same way, an asylum profile PAsyl is also logged in the second gatekeeper G-B in addition to the terminal profile P6300 for the second communication terminal KE2.

The asylum profile PAsyl is assigned to a communication terminal KE1, KE2, KE3, in cases in which the communication terminals KE1, KE2, KE3 login into a so-called asylum mode at the first or second gatekeeper G-A, G-B. For a login into the asylum mode, a communication terminal KE1, KE2, KE3 transmits the original call number 4711, 6300, 6529 assigned by the home gatekeeper G-A, G-B, G-C to the communication terminal KE1, KE2, KE3, the Internet Protocol address and also so-called asylum information assigned to the communication terminal KE1, KE2, KE3 in the Internet Protocol-based communication network IP-N. Unlike the conventional terminal profiles P4711, P6300, P6529 to which only a specific communication terminal KE1, KE2, KE3 can be assigned, the asylum profile PAsyl can be assigned to any communication terminal KE1, KE2, KE3.

In essence, the asylum profile includes a restricted number of the call numbers and a standard profile that can be assigned to the communication terminals KE1, KE2, KE3. For example, within the framework of the standard profile, authorizations and keyboard layouts that can be assigned to the communication terminals KE1, KE2, KE3 and subscriber names can be managed for the communication system KS. In this case, it is possible to define different authorizations for different subscribers. Therefore more comprehensive authorizations can be assigned to important subscribers—often designated VIP (very important person) subscribers in the literature—than to less important subscribers. It is, for example, feasible to assign an "official authorization" to specific subscribers in which case other subscribers are barred from the "official authorization". Therefore, "official authorization" in general means the authorization for a connection to an external terminal, i.e. a terminal not arranged in the communication system KS.

Therefore, it is also possible to define different asylum profiles PAsyl for different gatekeepers G-A, G-B, G-C in which case different authorizations are assigned to the different asylum profiles PAsyl, Therefore, by creating the—second—address in the communication terminal KE1, KE2, KE3, for access to an alternate gatekeeper, it can be controlled in a simple way which authorizations are assigned to a communication terminal KE1, KE2, KE3 in the asylum mode or to subscribers allocated to a communication terminal KE1, KE2, KE3.

Below, it is assumed that the first gatekeeper G-A or the assigned network segment N-A malfunction or have failed and the first communication terminal KE1 as a result of the malfunction or the failure login into the second gatekeeper G-B in the asylum mode. As a result, the second gatekeeper G-B assigns a temporary call number and the corresponding standard profile to the first communication terminal KE1. Therefore, the first communication terminal KE1 can initialize a connection setup as an alternate gatekeeper via the second gatekeeper G-B. In the case of a connection setup, the temporary call number assigned to the second gatekeeper G-B is not transferred as a sender address, but the original call number 4711 assigned to the first gatekeeper G-A. In this way, it is ensured that the first communication terminal KE1 or the subscriber Tin assigned to the first communication terminal KE1 can be identified at the called terminal. This is of particular importance for emergency calls for which a caller initializing the emergency call is often identified and located on the basis of a transmitted sender call number.

If the subscriber Tin assigned to the first communication terminal KE1 is a subscriber who is a very important person, the call number assigned to the second gatekeeper G-B also remains assigned to the subscriber Tin or the first communication terminal KE1 for the duration of the connection. In this way, the subscriber Tin or the first communication terminal KE1 can also be reached under this call number at a later point in time. In such cases, it is possible to divert a call from the first gatekeeper G-A to the second gatekeeper G-B for an arriving call request with the call number 4711. In this case, the call diversion must be created in the "exchange", i.e. in an external device not arranged in the communication system KS.

Should the first and second gatekeeper G-A, G-B have the same call number plan, the second gatekeeper G-B can assign the same call number 4711—originally assigned to the first gatekeeper G-A—to the first communication terminal KE1 instead of the temporary call number.

An important advantage of the method is that, particularly, in large communication systems KS, the costs for the device and administration of terminal profiles are reduced considerably. For example, in the case of a communication system KS with 10 gatekeepers and 10,000 communication terminals connected according to the related art, 20,000 terminal profiles and, with that, also call numbers must be provided. According to the method it is achieved that, for example, in the case of an erlang value of 0.1, a supply of 100 call numbers that can be assigned per gatekeeper and the predefinition of only one asylum profile PAsyl per gatekeeper is sufficient. Therefore, according to the method, the total number of call numbers required in the communication system KS only amounts to 11,000 in the case of 10,000 terminal profiles plus 10 asylum profiles.

The invention has been described in detail with particular reference to preferred embodiments thereof and examples, but it will be understood that variations and modifications can be effected within the spirit and scope of the invention.

What is claimed is:

1. A method for operating a communication system having a plurality of communication devices, a plurality of communication terminals and a communication network connecting the communication terminals to the communication devices, the method comprising:

storing a first address in each communication terminal for a connection to a respective home communication device;

storing a second address in each communication terminal for a connection to an alternate communication device;

storing at least one standard terminal profile in the alternate communication device being assignable to different terminals of the plurality of communication terminals; and as a result of accessing the alternate communication device by a particular communication terminal via the second address, said alternate communication device assigns one standard terminal profile to said particular communication terminal, such that said particular communication terminal can initialize connections via said alternate communication device.

2. The method according to claim 1, wherein when initiating a connection between the particular communication terminal and the alternate communication device, terminal relevant data for the particular communication terminal is sent to the alternate communication device, the terminal relevant data comprising:

a call number assigned by the home communication device to the particular communication terminal, third address information assigned to the particular communication terminal in the communication network, and asylum information to adapt the standardized terminal profile.

3. The method according to claim 2, wherein the terminal relevant data is sent by the particular communication terminal.

4. The method according to claim 3, wherein the standardized terminal profile manages a plurality of restricted call numbers that can be assigned to the communication terminals.

5. The method according to claim 4, wherein when the standardized terminal profile is adapted to the particular communication terminal, through the second address, a temporary call number is assigned to the particular communication terminal by the alternate communication device for a duration of the connection.

6. The method according to claim 5, wherein for a connection initialized by the particular communication terminal, a home call number used for communication between the home communication device and the particular communication terminal is transmitted to the alternate communication device by the particular communication terminal, and the home call number is used instead of the temporary allocated call number.

7. The method according to claim 5, wherein for a VIP subscriber assigned to a communication terminal, a call number of the alternate communication device is also assigned to the VIP subscriber for the duration of the connection.

8. The method according to claim 7, wherein during a connection setup with the particular communication terminal, a call is diverted from the home communication device to the alternate communication device.

9. The method according to claim 8, wherein the standardized terminal profile manages authorizations that can be assigned to a communication terminal.

10. The method according to claim 9, wherein different authorizations can be assigned to different subscribers assigned to the communication terminal.

11. The method according to claim 1, wherein the standardized terminal profile manages a predetermined number of restricted call numbers that can be assigned to the communication terminals.

12. The method according to claim 11, wherein if the standardized terminal profile is adapted to the particular communication terminal, through the second address, a temporary call number is assigned to the particular communication terminal by the alternate communication device for a duration of the connection.

13. The method according to claim 12, wherein for a connection initialized by the particular communication terminal, a home call number used for communication between the home communication device and the particular communication terminal is transmitted to the alternate communication device by the particular communication terminal, and the home call number is used instead of the temporary allocated call number.

14. The method according to claim 12, wherein for a VIP subscriber assigned to a communication terminal, a call number of the alternate communication device is also assigned to the VIP subscriber for the duration of the connection.

15. The method according to claim 12, wherein during a connection setup with the particular communication terminal, a call is diverted from the home communication device to the alternate communication device.

16. The method according to claim 1, wherein the standardized terminal profile manages authorizations that can be assigned to a communication terminal.

17. The method according to claim 16, wherein different authorizations can be assigned to different subscribers assigned to the communication terminal.

18. The method according to claim 1, wherein the standardized terminal profile is stored in the alternate communication device together with terminal specific data.

19. A communication system, comprising:

a plurality of communication devices;

a plurality of communication terminals;

a communication network connecting the communication terminals to the communication devices;

a memory device arranged in each of the communication terminals to store:

a first address for a connection to a home communication device assigned to the communication terminal; and a second address for a connection to an alternate communication device; and at least one standardized terminal profile included in terminal-relevant data in the alternate communication device, the standard terminal profile being assignable to different communication terminals when accessing the alternate communication device via the second address.

20. The communication system according to claim 19, wherein the communication network is an Internet Protocol-based computer network, and the communication terminals are Internet Protocol-enabled terminals.

* * * * *